(12) United States Patent
Johnson et al.

(10) Patent No.: US 7,204,445 B2
(45) Date of Patent: Apr. 17, 2007

(54) GUIDE ARRANGEMENTS FOR DATA STORAGE TAPE GUIDING SYSTEMS

(75) Inventors: Douglas W. Johnson, Stillwater, MN (US); Allan R. Markert, Lake Elmo, MN (US); Wayne P. Schaefer, North St. Paul, MN (US); Robert W. Tapani, Oakdale, MN (US)

(73) Assignee: Imation Corp., Oakdale, MN (US)

( * ) Notice: Subject to any disclaimer, the term of this patent is extended or adjusted under 35 U.S.C. 154(b) by 365 days.

(21) Appl. No.: 10/912,893

(22) Filed: Aug. 5, 2004

(65) Prior Publication Data

US 2006/0027693 A1 Feb. 9, 2006

(51) Int. Cl.
*G03B 23/02* (2006.01)

(52) U.S. Cl. .................. 242/346.2; 242/615.2

(58) Field of Classification Search ........ 242/346, 242/346.2, 615.2, 615.4, 548, 548.2, 566; 360/95, 130.21; 226/189, 196.1
See application file for complete search history.

(56) References Cited

U.S. PATENT DOCUMENTS

| | | | | |
|---|---|---|---|---|
| 3,939,494 A | * | 2/1976 | Okuda | 226/196.1 |
| 4,335,857 A | * | 6/1982 | Pfost et al. | 242/346.2 |
| 4,441,133 A | * | 4/1984 | Ogawa et al. | 242/615.2 |
| 5,173,828 A | * | 12/1992 | Tanzer et al. | 360/130.21 |
| 5,414,585 A | * | 5/1995 | Saliba | 360/130.21 |
| 5,772,143 A | * | 6/1998 | Runyon et al. | 242/346 |
| 5,893,526 A | | 4/1999 | Zwettler | |
| 6,116,535 A | * | 9/2000 | Selg et al. | 242/615.2 |
| 6,320,727 B1 | * | 11/2001 | Cope et al. | 360/130.21 |
| 6,343,757 B1 | | 2/2002 | Zwettler | |
| 6,353,514 B1 | | 3/2002 | Rambosek et al. | |
| 6,563,670 B2 | | 5/2003 | Brong et al. | |
| 6,644,581 B2 | | 11/2003 | Plourde et al. | |
| 6,886,766 B1 | * | 5/2005 | Weng et al. | 360/95 |
| 2001/0020633 A1 | * | 9/2001 | Ojima | 242/615.2 |
| 2004/0238669 A1 | | 12/2004 | Mewes et al. | |

OTHER PUBLICATIONS

"Data Storage Tape Guiding Systems using Tapered Guides," Johnson et al., U.S. Appl. 10/914,032, filed Aug. 5, 2004.

* cited by examiner

*Primary Examiner*—William A. Rivera
(74) *Attorney, Agent, or Firm*—Eric D. Levinson (57) ABSTRACT

The invention is directed to arrangements of tape guides which can improve the guiding of data storage tape. Tape guides having specific sizes relative to the data storage tape are also disclosed. The disclosed tape guides and arrangements of tape guides can improve the ability to properly guide the data storage tape, e.g., during media fabrication, servo recording or readout, data recording or data readout. The invention is particularly useful for magnetic tape, but may also find application with optical tape, holographic tape, or other formats of data storage tape.

20 Claims, 6 Drawing Sheets

GUIDE ARRANGEMENTS FOR DATA STORAGE TAPE GUIDING SYSTEMS

TECHNICAL FIELD

The invention relates to magnetic tape used for data storage, and more particularly, magnetic tape guides used to guide the magnetic tape during media fabrication, servo recording, data recording or data readout.

BACKGROUND

Data storage media are commonly used for storage and retrieval of data, and come in many forms, such as magnetic tape, magnetic disks, optical tape, optical disks, holographic disks, cards or tape, and the like. Magnetic tape media remains an economical medium that is particularly useful in storing large amounts of data. For example, magnetic tape cartridges, or large spools of magnetic tape are commonly used to back up large amounts of data for computing centers or businesses. Magnetic tape cartridges also find application in the backup of data stored on smaller computers such as desktop or laptop computers.

In magnetic tape, data is typically stored as magnetic signals that are magnetically recorded on the medium surface. The data stored on the magnetic tape is often organized along "data tracks," and read/write heads are positioned relative to the data tracks to write data to the tracks or read data from the tracks. Other types of data storage tape include optical tape, magneto-optic tape, holographic tape, and the like.

As the number of data tracks on data storage tape increases, the data storage capacity of the data storage tape likewise increases. However, as the number of data tracks increases, the tracks usually become narrower and more crowded on the surface of the data storage tape. Accordingly, an increase in the number of data tracks can make positioning of the read/write head relative to a desired data track more challenging. In particular, for proper data storage and recovery, the read/write head must locate each data track, and follow the path of the data track accurately along the surface of the data storage tape. In order to facilitate precise positioning of the read/write head relative to the data tracks on the data storage tape, servo techniques have been developed.

Servo information refers to signals, patterns or other recorded markings on the data storage tape that are used for tracking purposes. In other words, servo information is recorded on the data storage tape to provide reference points relative to the data tracks. A servo controller interprets detected servo information and generates position error signals. The position error signals are used to adjust the lateral position of the read/write head relative to the data tracks so that the read/write head is properly positioned along the data tracks for effective reading and/or writing of the data. A variety of different servo patterns have been developed, including time-based servo patterns, amplitude-based servo patterns, and other types of servo patterns. Time-based servo techniques typically make use of servo marks and time variables, as the servo marks feed past a head at a constant velocity. Amplitude-based servo techniques typically involve the detection of servo signal amplitudes, which enables identification of head positioning relative to the medium.

With some data storage tape, such as magnetic tape, the servo information is often stored in specialized tracks on the medium, called "servo tracks." Servo tracks serve as references for the servo controller. Conventional servo tracks typically hold no data except for information that is useful to the servo controller to identify positioning of a read/write head relative to the surface of the data storage tape. Alternatively, servo information may be interspersed within the data tracks, e.g., at regular intervals.

In any case, the servo information is typically recorded during media fabrication. Then, the servo information is sensed by one or more servo heads during use of the medium in order to pinpoint locations of the data tracks. For example, servo heads may be dedicated heads that read only servo information. Once the servo head locates a particular servo track, one or more data tracks can be located on the medium according to the data track's displacement from the servo track. The servo controller receives detected servo signals from the servo heads, and generates position error signals, which are used to adjust positioning of a read/write head relative to the data tracks.

The ability to properly guide the magnetic tape during media fabrication, servo recording, data recording and data readout can be a limiting factor in achieving improved track densities on magnetic tape, or other data storage tape. For example, the ability to record an increased number of servo tracks on magnetic tape can be limited by the ability to properly guide the magnetic tape during servo writing. Moreover, the ability to increase the density of servo tracks, and thereby allow for increased density of data tracks, can also be limited by tape guiding limitations. Furthermore, the ability to read the servo patterns, or to record and readout data tracks presents similar tape guiding challenges. As track densities continue to progress, these tape guiding challenges will become more significant.

SUMMARY

In general, the invention is directed to arrangements of tape guides which can improve the guiding of data storage tape. Tape guides having specific sizes relative to the data storage tape are also disclosed. The disclosed tape guides and arrangements of tape guides can improve the ability to properly guide the data storage tape, e.g., during media fabrication, servo recording or readout, data recording or data readout. The invention is useful for magnetic tape, but may also find application with optical tape, holographic tape, or other formats of data storage tape.

In one embodiment, the invention provides a data storage tape guiding system comprising a set of guides arranged to guide a data storage tape along a tape path. The data storage tape guiding system may include a first guide including a first flange to contact a bottom edge of the data storage tape, and a second guide including a second flange to contact a top edge of the data storage tape. The first and second guides can be arranged such that a cross-tape distance between the first flange of the first guide and the second flange of the second guide is less than a width of the data storage tape.

In another embodiment, the invention provides a magnetic tape system comprising a magnetic tape, a magnetic head, and a set of guides arranged to guide the magnetic tape along a tape path over the magnetic head. The magnetic head may be used to read or write to the magnetic tape, and may be used for servo writing, servo verification or other servo readout, data recording, data readout, or the like. The set of guides may comprise a first guide positioned before the magnetic head along the tape path and including a first flange to contact a bottom edge of the magnetic tape, and a second guide positioned after the magnetic head along the tape path and including a second flange to contact a top edge of the magnetic tape. A cross-tape distance between the first flange of the first guide and the second flange of the second guide may be less than a width of the magnetic tape.

In another embodiment, the invention provides a magnetic tape system comprising a magnetic tape, a magnetic head, and a set of guides arranged to guide the magnetic tape along a tape path over the magnetic head. The set of guides may comprise a first guide positioned before the magnetic head along the tape path, and a second guide positioned after the magnetic head along the tape path. A distance between the first guide and the second guide along the tape path may be less than 2 multiplied by a width of the magnetic tape.

In another embodiment, the invention provides a tape guide for data storage tape comprising a tape path surface, an upper flange adjacent to the tape path surface, and a lower flange adjacent to the tape path surface. The tape path surface between the upper flange and lower flange may define a width less than 0.001 inch (0.00254 cm) greater than a width of the data storage tape.

The invention may be capable of providing one or more advantages. In particular, the disclosed tape guides and arrangements of tape guides can generally improve the ability to properly guide the data storage tape. The disclosed tape guides and arrangements of tape guides may be used during media fabrication, servo recording, data recording, data readout or any other use for which accurate tape guiding is desirable. The invention is particularly useful for magnetic tape, but may also find application with optical tape, magneto-optic tape, holographic tape, or other formats of data storage tape. For magnetic tape, the invention may be used during servo writing to improve the accuracy of recorded servo tracks, and thereby improve track density on the magnetic tape, resulting in improved storage capacity.

Moreover, the guides and arrangements of guides described herein can allow for significant improvements in closed-loop tracking of recorded servo signals. In particular, when the invention is used during servo recording, a standard deviation of a tracking error associated with closed-loop tracking of the servo patterns during readout can be reduced to less than 0.1 micron, which equates to track densities on the order of 3000 tracks per inch (1181 tracks per cm). This improvement in tracking can be achieved based on use of the tape guiding techniques during servo writing and readout. In particular, the improved tape guiding results in improved servo track linearity with respect to the tape edge, which allows for the improvements in servo recording and tracking during readout. The arrangements of guides may also substantially reduce or eliminate cross-tape tension gradients at a location corresponding to a magnetic recording head.

The details of one or more embodiments of the invention are set forth in the accompanying drawings and the description below. Other features, objects, and advantages of the invention will be apparent from the description and drawings, and from the claims.

DETAILED DESCRIPTION

The invention is directed to arrangements of tape guides which can improve the guiding of data storage tape, such as magnetic tape. Tape guides having specific sizes relative to the data storage tape are also disclosed. The disclosed tape guides and arrangements of tape guides may be used during media fabrication, servo recording, data recording, data readout or any other occasion during which accurate tape guiding is desirable. The invention is particularly useful for magnetic tape, but may also find application with optical tape, holographic tape, magneto-optic tape or other formats of data storage tape.

For magnetic tape, the invention may be used during servo writing to improve the accuracy of recorded servo tracks. The arrangements of guides described herein may also reduce or eliminate cross-tape tension gradients at a location corresponding to a magnetic recording head. When various aspects of the invention are used during servo recording and readout, the standard deviation of a tracking error associated with closed-loop tracking of the servo patterns during readout can be reduced to less than 0.1 micron. In that case, the improved guiding during servo recording can result in improved servo track linearity with respect to the tape edge, which allows for the improvements in tracking of recorded servo signals during the servo readout.

Figure 1:
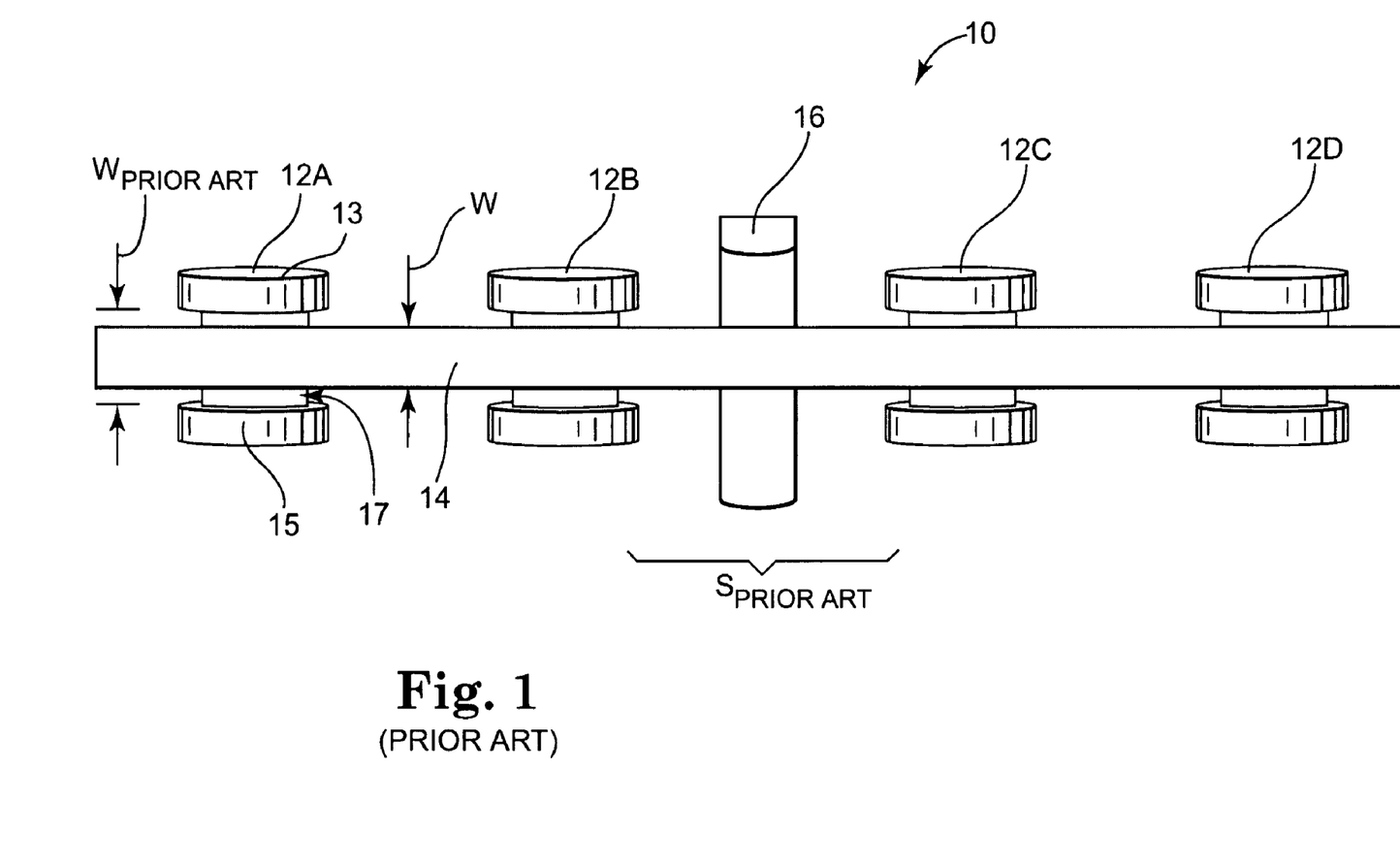
FIG. 1 is a perspective view of a prior art magnetic tape system including an arrangement of tape guides, a magnetic head and a magnetic tape passing through the guides and over the head.

FIG. 1 is a perspective view of a prior art magnetic tape system 10 including an arrangement of tape guides 12A–12D (collectively guides 12), a magnetic head 16, and a magnetic tape 14 passing through guides 12 and over head 16. Each of guides 12 is substantially similar, and will be specifically described with reference to guide 12A. As shown, guide 12A includes an upper flange 13, a lower flange 15 and a tape path surface 17 between flanges 13, 15. Magnetic tape 14 passes over tape path surface 17 and is guided by flanges 13, 15.

The width (W) of magnetic tape 14 is labeled on FIG. 1. In prior art tape guides, the width ($W_{PRIOR\ ART}$) of the tape path surface of the guides is much greater than the width (W) of magnetic tape. In particular, the width ($W_{PRIOR\ ART}$) is typically at least 0.005 inch (0.0127 cm) greater than the width (W) of magnetic tape. For example, prior art magnetic tape having a 0.5 inch (1.27 cm) tape width is typically guided by guides defining a tape path surface between the flanges of 0.505 inch (1.2827 cm) or greater.

Also, in prior art magnetic tape system 10, the spacing ($S_{PRIOR\ ART}$) between guides 12B and 12C is typically much larger than the width (W) of magnetic tape 14. In particular, the prior art spacing ($S_{PRIOR\ ART}$) between guides 12B and 12C is typically greater than 3 to 5 times the width (W) of magnetic tape 14.

In accordance with the invention, it has been discovered that the widths of the guides relative to the tape width can have a significant impact on the ability to guide the data storage tape with accuracy. In particular, experimental research has determined that reductions in guide widths, relative to prior art guides, can improve the ability to guide the data storage tape. Also, experimental research has determined that the reductions in the spacing between the guides that are positioned on either side of a head can also have a significant positive impact on the ability to guide data storage tape over the head with accuracy. Various arrangements of guides have also be discovered to yield improved results on the ability to guide data storage tape. These and other embodiments of the invention are described in greater detail below.

Figure 2:
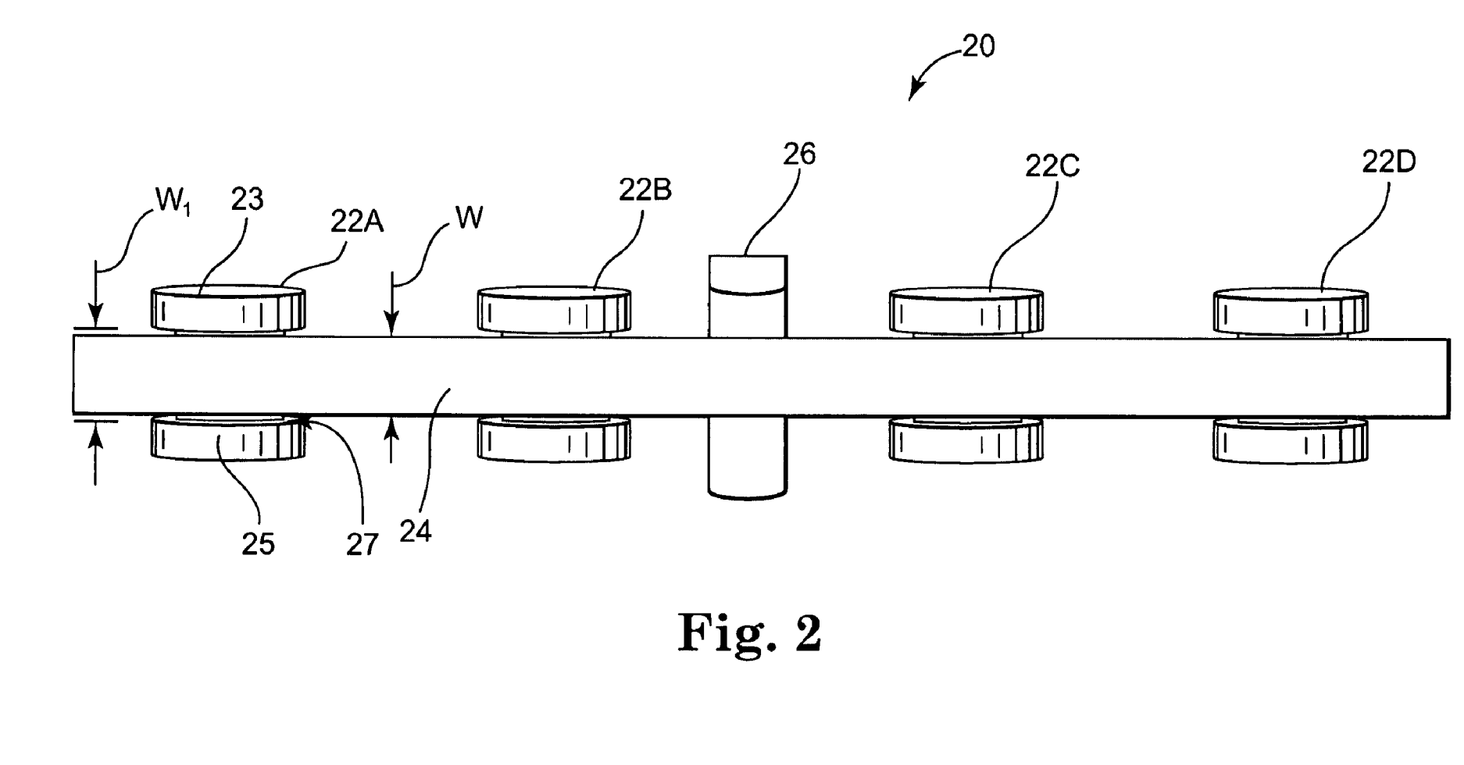
FIGS. 2 and 3 are perspective views of a magnetic tape system including tape guides having reduced widths relative to those of the prior art.

FIG. 2 is a perspective view depicting a magnetic tape system 20 according to an embodiment of the invention. Magnetic tape system 20 includes an arrangement of tape guides 22A–22D (collectively guides 22), a magnetic head 26, and a magnetic tape 24 passing through guides 22 and over head 26. In particular, magnetic tape 24 passes through guides 22 and over head 26 to facilitate the recording or readout of servo patterns or data. Head 26 and the other heads described herein may comprise servo write heads designed to write servo patterns on magnetic tape, or servo read heads designed to read the servo patterns. In other examples, head 26 may comprise a head designed for data recording or data readout.

A set of two or more of guides 22 may also be referred to herein as a tape guiding system. Each of guides 22 may be substantially similar, although the invention is not necessarily limited in this respect. Guides 22 will be specifically described with reference to guide 22A. As shown, guide 22A includes an upper flange 23, a lower flange 25 and a tape path surface 27 between flanges 23, 25. Magnetic tape 24 passes over tape path surface 27 and is guided by flanges 23, 25.

Guides 22 may comprise generally cylindrical shaped centers which form the tape paths surface, and disk-shaped flanges adjacent to the cylindrical centers. However, other shapes could also be used. Guides 22 may comprise polished steel or any other material. Guides 22 may comprise hydrodynamic air bearing guides, in which case magnetic tape 24 "flies" over the tape path surfaces of guides 22 and the motion of magnetic tape 24 creates an air barrier between guides 22 and magnetic tape 24. Alternatively, guides 22 may comprise hydrostatic air bearing guides, in which case magnetic tape 24 "flies" over guides 22, but the air is introduced by an external source to create the air barrier between guides 22 and magnetic tape 24. In still other examples, guides 22 may comprise roller bearings, in which case, the tape path surfaces of the guides comprise rollers that roll with magnetic tape 24 as magnetic tape 24 feeds over guides 22.

In accordance with one aspect of the invention, guides 22 may define tape path surface widths relative to the width of magnetic tape 24 that are substantially reduced in comparison to the prior art. The width (W) of magnetic tape 24 is labeled on FIG. 2. In accordance with the invention, the width ($W_1$) is greater than the width (W) of magnetic tape 24 by less than approximately 0.001 inch (0.00254 cm), and in some cases less than approximately 0.0005 inch (0.00127 cm). For example, if magnetic tape has a 0.5 inch (1.27 cm) tape width, the tape path surface 27 of guide 22A, for example, defines a width less than approximately 0.501 inch (1.27254 cm), and in some cases less than approximately 0.5005 inch (1.27127 cm). In other words, the distance between flanges 23 and 25 defines a width ($W_1$) that is greater than the width (W) of magnetic tape 24 by less than 0.001 inch (0.00254 cm), and in some cases less than 0.0005 inch (0.00127 cm). In other cases, it may be desirable to define width ($W_1$) to be greater than width (W) within the range of 0.001 inch to 0.0005 inch in order to approximately match $W_1$ to the width of the tape, but allow for slight clearance to account for thermal expansion effects in the magnetic tape.

These reductions in the widths of guides 22 relative to the width of magnetic tape 24 can significantly impact the ability to properly guide magnetic tape 24 over head 26. In different arrangements, head 26 may be positioned on the same side or the opposing side of magnetic tape 24, relative to guides 22. In any case, the invention is particularly useful during servo writing because servo writing accuracy can be limited by an inability to accurately guide magnetic tape 24 over head 26. For example, reductions in the widths of guides 22 can significantly improve the ability to perform closed-loop tracking of recorded servo signals during readout verification of recorded servo signals, by improving the linearity of recorded servo signals with respect to the tape edge.

Figure 3:
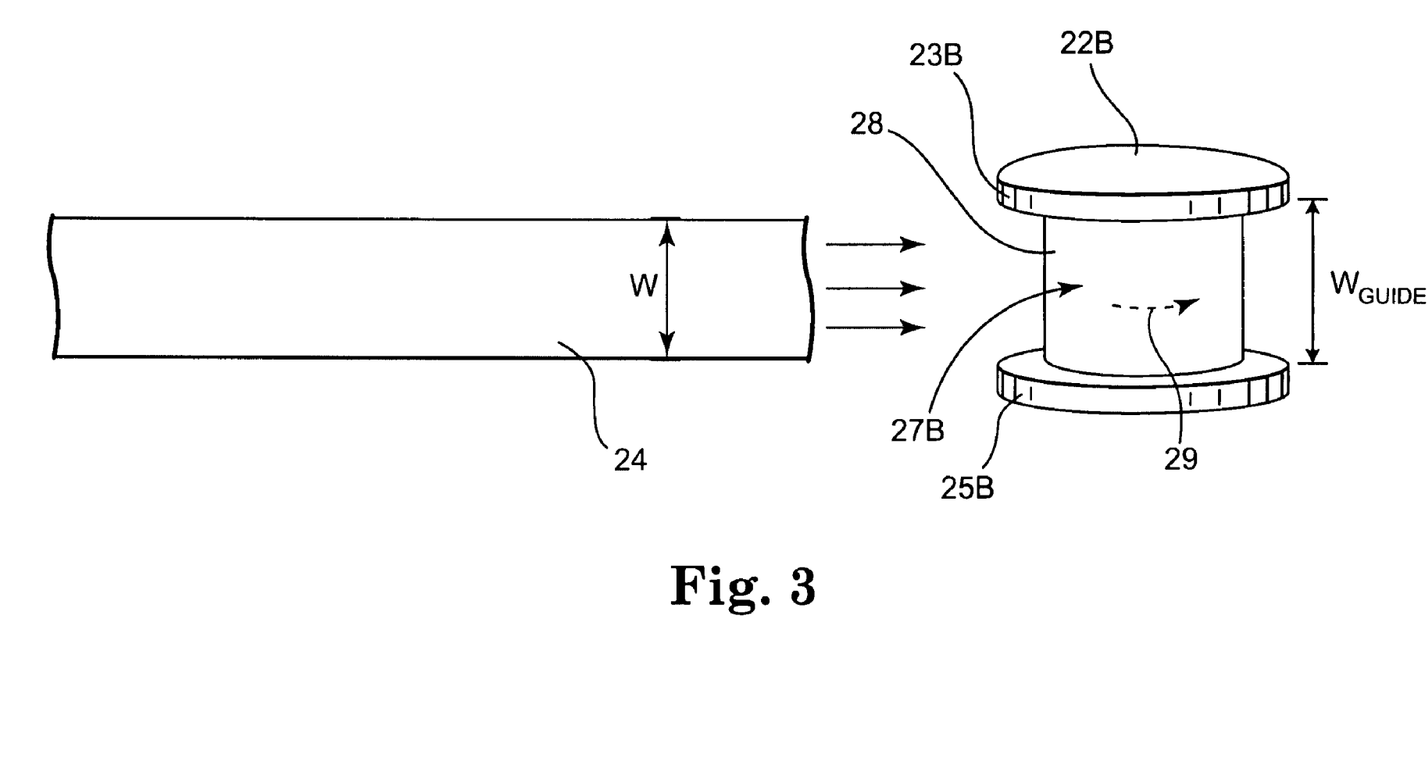

FIG. 3 is another perspective view of magnetic tape 24 to be passed over tape guide 22B. As shown, tape guide 22B defines a tape path surface 27B. Flanges 23B, 25B adjacent to tape path surface 27B define the boundaries of tape path surface 27B. Tape path surface 27B may comprise a portion of a generally cylindrical center (or core) 28 of tape guide 22B. For example, arrow 29 may define the portion of cylindrical center 28 over which magnetic tape 24 passes along the tape path. Many other shapes, however, could also be used with guides in accordance with the invention. Importantly, the width ($W_{GUIDE}$) of tape path surface 27B defined between flanges 23B, 25B is that is greater than the width (W) of magnetic tape 24 by less than 0.001 inch (0.00254 cm), and in some cases less than 0.0005 inch (0.00127 cm).

Figure 4:
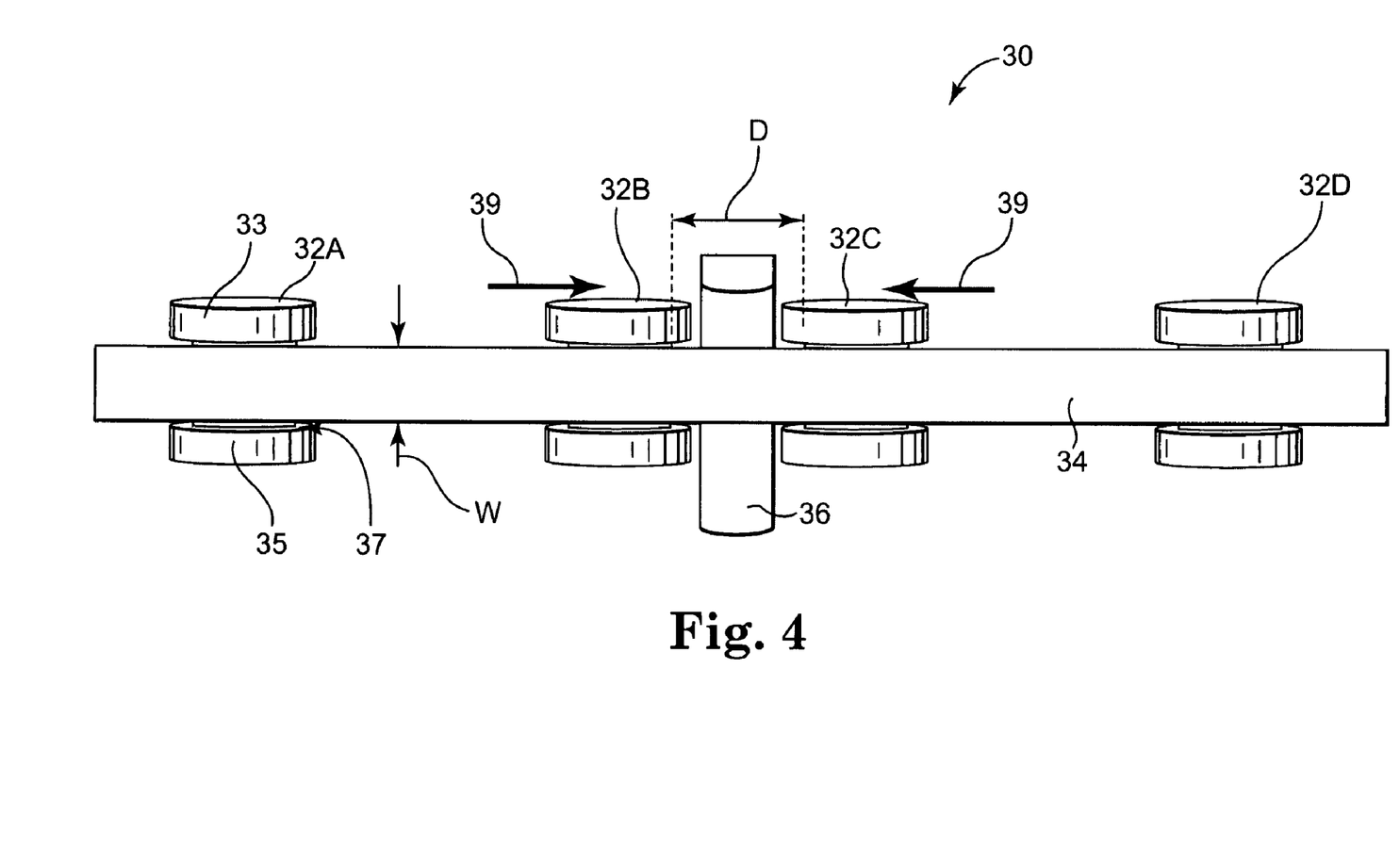
FIG. 4 is a perspective view of a magnetic tape system including an arrangement of tape guides in which guides are spaced more closely to a magnetic head than those of the prior art.

FIG. 4 is a perspective view depicting a magnetic tape system 30 according to another embodiment of the invention. Magnetic tape system 30 includes an arrangement of tape guides 32A–32D (collectively guides 32), a magnetic head 36, and a magnetic tape 34 passing through guides 32 and over head 36. Again, a set of two or more of guides 32 may also be referred to herein as a tape guiding system. Head 36 may be positioned on either side of magnetic tape 34, e.g., the same side or a different side than guides 32. Each of guides 32 may be substantially similar, although the invention is not necessarily limited in this respect. Guides 32 will be specifically described with reference to guide 32A. As shown, guide 32A includes an upper flange 33, a lower flange 35 and a tape path surface 37 between flanges 33, 35. Magnetic tape 34 passes over tape path surface 37 and is guided over tape path surface 37 between flanges 33, 35.

Again, guides 32 may comprise a generally cylindrical shaped core with disk shaped flanges 33, 35 adjacent to the core, although other shapes could also be used. Guides 32 may comprise polished steel or any other material. Guides 32 may comprise hydrodynamic air bearing guides, hydrostatic air bearing guides, roller bearings, or other types of guides.

In accordance with another aspect of the invention, guides 32B and 32C can be arranged in a manner that significantly improves the ability to guide magnetic tape 34 over head 36. In particular, a distance (D) between guide 32B and guide 32C along the tape path is less than 2 multiplied by the width (W) of magnetic tape 34. In other words, guides 32B and 32C, which are positioned on either side of magnetic head 36 along the tape path, are moved closer to head 36, relative to prior art systems. For 0.5 inch wide magnetic tape (1.27 cm wide), the distance (D), for example, may be less than 1.0 inch (2.54 cm). The distance (D) is measured from the edge of central core of guide 32B to the edge of the central core of guide 32C, and not from the edges of the flanges.

Significant improvements in the ability to guide tape 34 over magnetic head 36 can be obtained when the distance (D) between guides 32B and 32C on either side of head 36 along the tape path is less than 2 multiplied by the width (W) of magnetic tape 34. For example, when the distance (D) between guides 32B and 32C is less than 2 multiplied by the width (W) of magnetic tape 34, servo signals can be recorded in a manner that results in significant improvements in the ability to perform closed-loop tracking on the servo signals. These improvements in tracking are the result of improved guiding during servo writing and readout. In particular, improved guiding can improve servo track linearity with respect to the tape edge, which ultimately results in improvements in the closed-loop tracking. The arrows 39 illustrate that guides 32B and 32C are moved closer to head 36 than is customary in the prior art. With guides having cylindrical shaped cores, the distance (D) is measured from the edge of the central core of guide 32B to the edge of the central core of guide 32C. More generally, however, the distance less than 2 times the width of the magnetic tape may extend from the tape path surfaces of the guides on either side of head. The features and embodiments illustrated in FIGS. 2 and 4 may also be used in combination, thereby yielding aspects of the tape guiding advantages of both embodiments.

Figure 5:
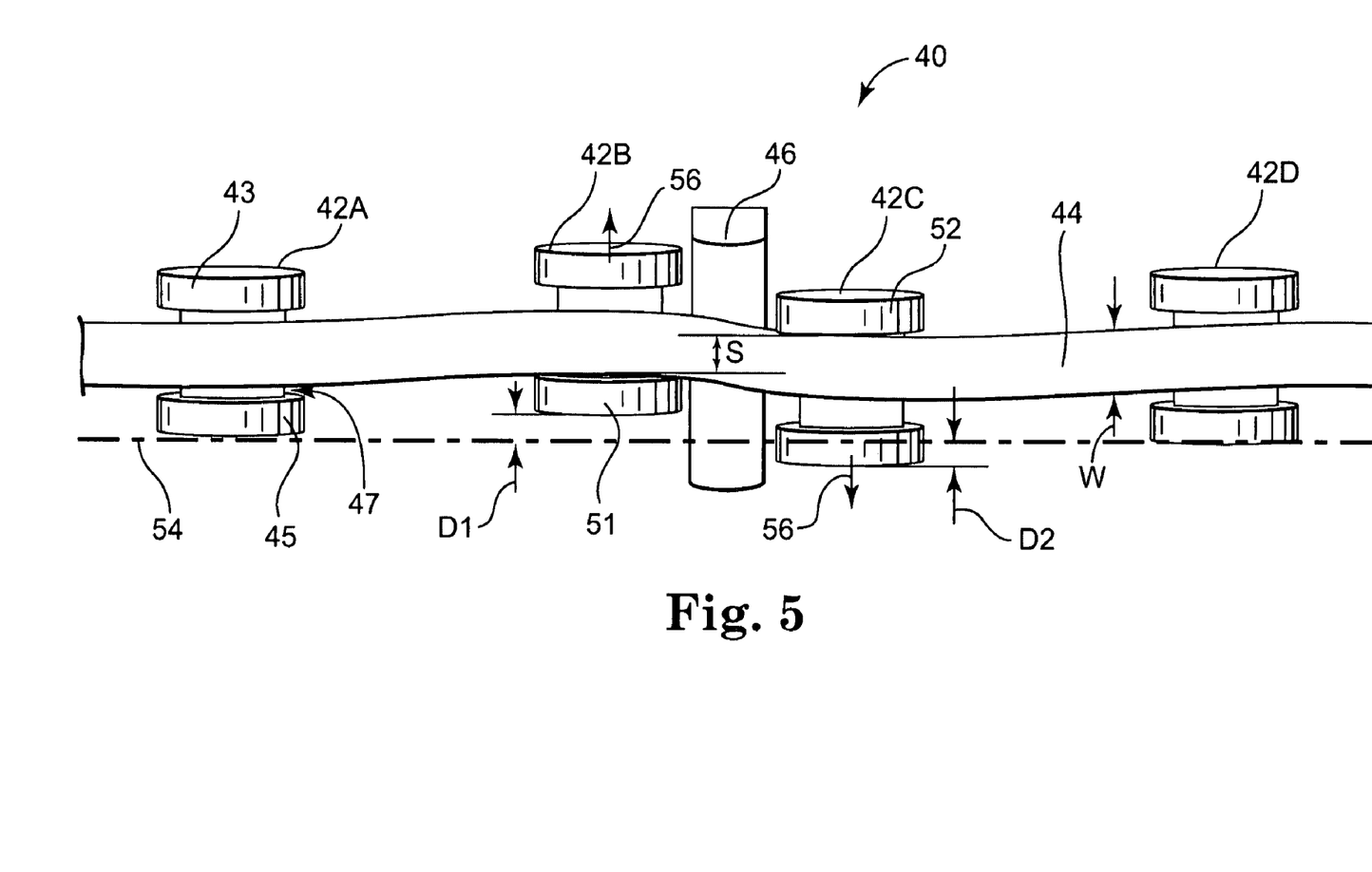
FIGS. 5 and 6 are perspective views of a magnetic tape system including an arrangement of tape guides in which guides are arranged to exert shear force on the magnetic tape according to embodiments of the invention.

FIG. 5 is a perspective view depicting a magnetic tape system 40 according to another embodiment of the invention. The features and embodiments illustrated in FIGS. 2 and 4 may also be used in combination with the features described below with reference to FIG. 5. Like the other systems described herein, magnetic tape system 40 of FIG. 5 includes an arrangement of tape guides 42A–42D (collectively guides 42), a magnetic head 46, and a magnetic tape 44 passing through guides 42 and over head 46. Again, a set of two or more of guides 42 may also be referred to herein as a tape guiding system. Each of guides 42 may be substantially similar, although the invention is not necessarily limited in this respect.

Guides 42 will be specifically described with reference to guide 42A. As shown, guide 42A includes an upper flange 43, a lower flange 45 and a tape path surface 47 between flanges 43, 45. Magnetic tape 44 passes over tape path surface 47 and is guided by flanges 43, 45. In particular, in the arrangement illustrated in FIG. 5, guides 42B and 42C, which are respectively positioned before and after head 46 along the tape path, are positioned at different positions relative to a tape path datum 54. Specifically, guide 42B is positioned above a conventional linear position before head 46, and guide 42C is positioned below the conventional linear position after head 46. This causes a shear force to be exerted on magnetic tape 44 specifically in the region of tape between guides 42B and 42C.

Like the other embodiments described herein, guides 42 may comprise a generally cylindrical shaped core with disk-shaped flange, although other shapes could also be used. In other words, each of guides 42 may form a cylindrical center which defines a tape path surface, with disk shaped flanges adjacent to the cylindrical center. Again, guides 42 may comprise polished steel, or any other material. In various embodiments, guides 42 may comprise hydrodynamic air bearing guides, hydrostatic air bearing guides, roller bearing guides, or another type of guide such as a non-cylindrical elongated tape transport guide.

In accordance with an aspect of the invention, guides 42B and 42C can be arranged in a manner that significantly improves the ability to guide magnetic tape 44 over head 46 by causing guides to exert shear loading forces on magnetic tape 44. For example, guide 42B can be positioned before magnetic head 46 along the tape path. Guide 42B includes a bottom flange 51 to contact a bottom edge of magnetic tape 44. Guide 42C can be positioned after magnetic head 46 along the tape path. Guide 42C includes a top flange 52 to contact a top edge of magnetic tape 44. As shown, a cross-tape distance (S) between the bottom flange 51 of guide 42B and top flange 52 of guide 42C is less than the width of magnetic tape 44. As magnetic tape 44 passes through guides 42B and 42C, bottom flange 51 of guide 42B and top flange 52 of guide 42C exert shear loading forces on magnetic tape 44, and thereby create a shear force in magnetic tape 44 between guides 42B and 42C. However, a tension gradient across magnetic tape 44 can be made substantially zero at the location where magnetic tape 44 passes over head 46. A zero tension gradient is desirable to avoid uneven wearing of the head over time or uneven fly height of tape over the head.

A linear datum 54 is also illustrated in FIG. 5 for reference purposes. Guide 42B can be elevated by distance D1 from linear datum 54 and guide 42C can be lowered by distance D2 from linear datum 54. D1 may equal D2, which can help ensure that the tension gradient across magnetic tape 44 can be made substantially zero at the location where magnetic tape 44 passes over head 46. By positioning guides 42B and 42C at offset locations with respect to linear datum 54, a cross-tape distance (S) between the bottom flange 51 of guide 42B and top flange 52 of guide 42C can be made less than the width of magnetic tape 44. Such an arrangement can significantly improve the ability to properly guide magnetic tape 44 over head 46. The arrangement illustrated in FIG. 5 may be particularly useful during servo writing, and can improve closed-loop tracking of recorded servo signals. For example, this arrangement may also allow for the standard deviation of tracking errors associated with closed-loop tracking of the servo patterns to be reduced to less than 0.1 micron. Moreover, this improvement in tracking can be achieved by improving the tape guiding during servo writing and readout. In particular, the improved guiding results in improved servo track linearity with respect to the tape edge, which allows for the improvements in tracking because the servo lines are recorded in a straighter fashion relative to the tape edge.

Arrows 56 illustrate that guide 42B is moved upward and 42C is moved downward relative to head 46 and linear datum 54. It is understood, however, that the same advantages could be realized with guide 42B being moved downward and 42C being moved upward relative to head 46. Both scenarios would introduce desirable shear loading on magnetic tape 44, which can help ensure that the tape is guided more linearly over head 46.

The amount of shear loading introduced by guides 42B and 42C can be selected based on the relative positioning of the guides. The amount of shear loading should be sufficient to result in improved servo track linearity of recorded signals, but not excessive so that damage to the magnetic tape can be avoided. The chosen value for cross-tape distance (S), for example, should be less than the width of magnetic tape 44, but greater than zero. The most desirable positioning, however, may also depend upon other variables such as the level of tension and tape speed used in the system. For magnetic tape of an approximately 0.5 inch (1.27 cm) width, suitable values for S may be in a range of 0.496 to 0.500 inches (1.260 to 1.270 cm), with suitable values of D1 and D2 being in a range of 0.0005 to 0.002 inches (0.00127 to 0.00508 cm).

In some embodiments, the features illustrated in FIGS. 2–4 may also be used in combination with the features and embodiments illustrated in FIG. 5, thereby yielding aspects of the tape guiding and servo tracking advantages of all of these embodiments. However, in other embodiments, the features and embodiments illustrated and described herein may be used alone or in combination with some, but not all, of the other embodiments described herein.

When the guides are arranged to introduce shear loading forces on the magnetic tape, as shown in FIG. 5, the tape path may deviate from a linear tape datum. In that case, it may be desirable to rotate the magnetic head slightly, in order to orient the magnetic head to be perpendicular to the magnetic tape. In particular, the bottom flange 51 of guide 42B and the top flange 52 of guide 42C causes magnetic tape 44 to deviate from linear tape path datum 54 between guides 42B and 42C. Accordingly, magnetic head 46 can be tilted (not shown in FIG. 5) so as to be perpendicular to magnetic tape 44 and non-perpendicular to the linear tape path datum 54.

Figure 6:
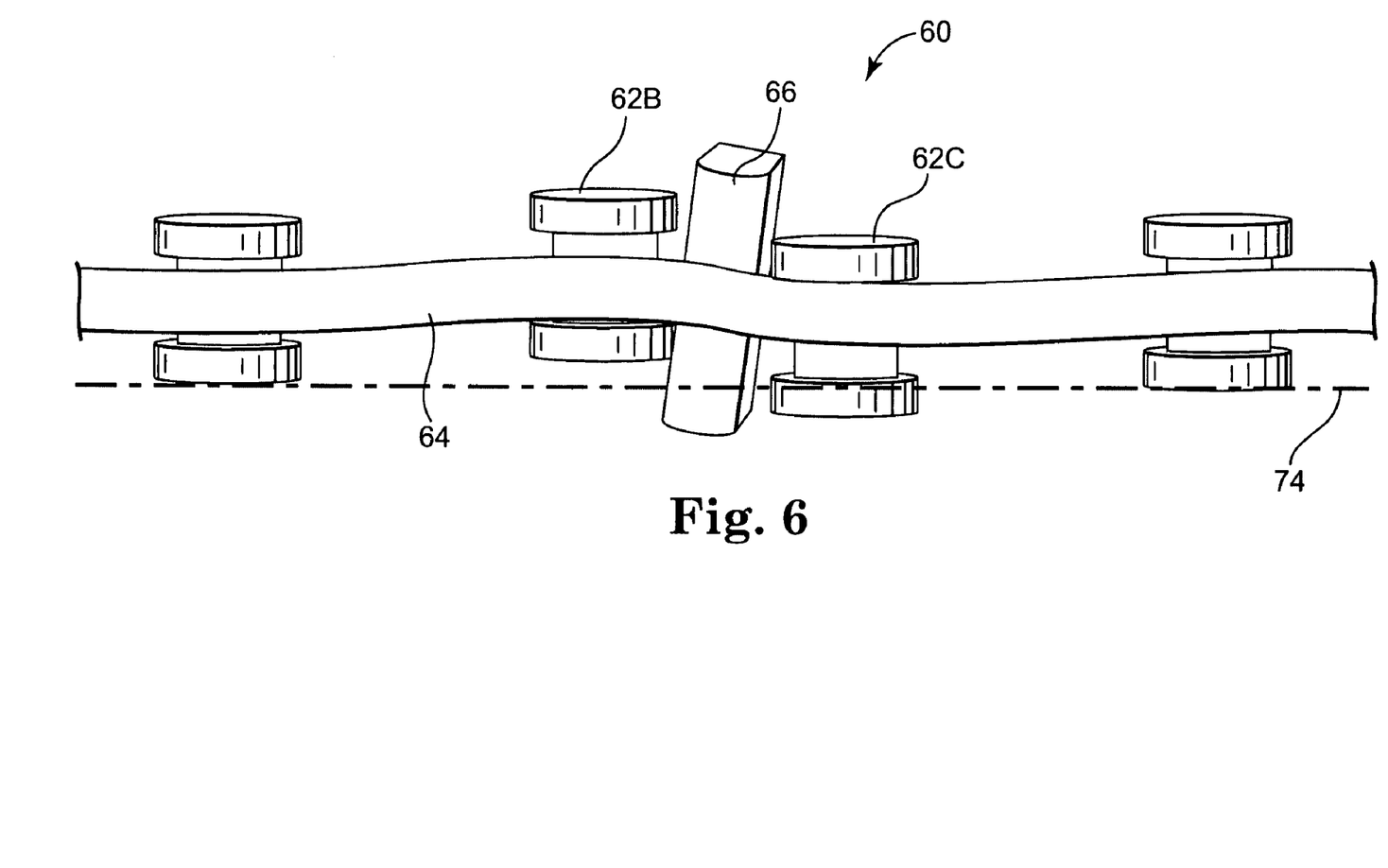

FIG. 6 is a perspective view depicting a magnetic tape system 60, which is very similar to the magnetic tape system 40 of FIG. 5. As shown in FIG. 6, guides 62B and 62C are arranged to create shear forces in magnetic tape 64 and cause magnetic tape to deviate from linear tape path datum 74. Magnetic head 66 is tilted so as to be perpendicular to magnetic tape 64 and non-perpendicular to the linear tape path datum 74. Alternatively, magnetic gaps of head 66 could be patterned so as to provide the necessary tilt in the gaps, without requiring physical tilting of the head as illustrated in FIG. 6.

As mentioned above, the various arrangements of guides described herein can allow for the standard deviation of tracking errors associated with closed-loop tracking of the servo patterns to be reduced to less than approximately 0.1 micron. In particular, when the techniques described herein are used during servo writing, the recorded servo patterns have improved linearity on the magnetic tape, which allows for the improved closed-loop tracking during readout.

Because this disclosure is directed to guiding improvements for magnetic tape (or other data storage tape), a standard may be defined with respect to this disclosure, to describe a reasonable servo actuator system that would be used to read servo patterns recorded using the guiding techniques described herein. It is common in the magnetic tape industry to measure open-loop guiding by reading the servo signal or measuring tape motion with a sensor, without moving the servo head or servo actuator. Then, one can simulate a reasonable closed-loop servo tracking response by passing the open-loop signal through a second order high pass filter.

The equation for such a filter is:

$$FilterOutput(s) = \frac{s^2}{s^2 + s \cdot \frac{\omega_n}{Q} + \omega_n^2}$$

Where S is complex frequency in cycles per meter, $\omega_n$ is the natural frequency and Q is a unitless damping factor. Reasonable values for $\omega_n$ and Q for tape systems are 60 cycles per meter and 1.333 respectively. Using these values, a suppression curve can be developed and the closed-loop response can be statistically analyzed. Moreover, the standard deviation of the closed-loop tracking can be used as a measure of performance. A typical range of values for the standard deviation of the closed-loop tracking is approximately 0.2 micron to 0.3 micron for modern tape transports with the capability of supporting up to 1500 tracks per inch. In accordance with the invention, however, standard deviations of the closed-loop tracking can be consistently demonstrated at less than approximately 0.1 µm, which would support up to 3000 tracks per inch (1181 tracks per cm). Accordingly, aspects of the invention may allow the storage capacity of magnetic tape to double, based solely on guiding improvements during servo writing and servo readout. The improved guiding allows for servo tracks (and therefore the data tracks) to have improved linearity parallel to the tape edge.

Various embodiments of the invention have been described that may be used individually or in combination with other embodiments to provide for improvements in tape guiding. Although primarily described in the context of magnetic tape guiding, the invention may also be useful in guiding holographic tape, optical tape, magneto-optic tape, or other future generation data storage media.

The guides described above have been primarily described and illustrated as cylindrical guides having cylindrical cores with disk-shaped flanges. However, the same principles would apply to other non-cylindrical shaped guides, including elongated tape guides that define a complex tape path. In any case, the guides may be formed of any desirable material, e.g., polished steel. In various examples, the guides may be air bearing hydrodynamic guides, air bearing hydrostatic guides, or non-air bearing roller guides.

The guides and arrangements of guides may be used in servo writers, or various devices used during media fabrication. In other examples, guides and arrangements of guides may be used in tape drives, tape cartridges, or any other setting where tape guiding is desirable. As examples, the guides and arrangements of guides described herein may be used to guide the magnetic tape during media fabrication, servo recording and servo verification, servo readout, data recording or data readout. These and other embodiments are within the scope of the following claims.

The invention claimed is:

1. A data storage tape guiding system comprising a set of guides arranged to guide a data storage tape along a tape path, the data storage tape guiding system including:
   a first guide including a first flange to contact a bottom edge of the data storage tape; and
   a second guide including a second flange to contact top edge of the data storage tape, wherein a cross-tape distance between the first flange of the first guide and the second flange of the second guide is less than a width of the data storage tape.

2. The data storage tape guiding system of claim 1, wherein the first flange of the first guide and the second flange of the second guide are positioned to create a shear force in the data storage tape between the first and second guides.

3. The data storage tape guiding system of claim 1, wherein the first guide includes an upper flange and a lower flange, the upper flange of the first guide being the first flange, and wherein the second guide includes an upper flange and a lower flange, the lower flange of the second guide being the second flange.

4. The data storage tape guiding system of claim 3, wherein a distance between the upper and lower flanges of the first and second guides is less than approximately 0.001 inch greater than a width of the data storage tape.

5. The data storage tape guiding system of claim 1, wherein the first and second guides comprise cylindrical-shaped cores.

6. The data storage tape guiding system of claim 1, wherein the first and second guides comprise air bearing guides in which the data storage tape flies over the guides.

7. A magnetic tape system comprising:
   a magnetic tape;
   a magnetic head; and
   a set of guides arranged to guide the magnetic tape along a tape path over the magnetic head, the set of guides comprising:
      a first guide positioned before the magnetic head along the tape path and including a first flange to contact a bottom edge of the magnetic tape, and
      a second guide positioned after the magnetic head along the tape path and including a second flange to contact a top edge of the magnetic tape, wherein a cross-tape distance between the first flange of the first guide and the second flange of the second guide is less than a width of the magnetic tape.

8. The magnetic tape system of claim 7, wherein a distance between the first guide and the second guide along the tape path is less than 2 multiplied by a width of the magnetic tape.

9. The magnetic tape system of claim 7, wherein the first flange of the first guide and the second flange of the second guide cause the magnetic tape to deviate from a linear tape path datum between the first and second guides, wherein the magnetic head is tilted so as to be perpendicular to the magnetic tape and non-perpendicular to the linear tape path datum between the first and second guides.

10. The magnetic tape system of claim 7, wherein a cross-tape distance between the first flange of the first guide and the second flange of the second guide is less than a width of the magnetic tape.

11. The magnetic tape system of claim 7, wherein the first guide includes an upper flange and a lower flange, the upper flange of the first guide being the first flange, and wherein the second guide includes an upper flange and a lower flange, the lower flange of the second guide being the second flange, wherein a distance between the upper and lower flanges of the first and second guides is less than approximately 0.001 inch greater than a width of the magnetic tape.

12. The magnetic tape system of claim 7, wherein the first flange of the first guide and the second flange of the second guide are positioned to create a shear force in the data storage tape between the first and second guides, and wherein a tension gradient across the magnetic tape is substantially zero at a location where the magnetic tape passes over the magnetic head.

13. A magnetic tape system comprising:
   a magnetic tape;
   a magnetic head; and
   a set of guides arranged to guide the magnetic tape along a tape path over the magnetic head, the set of guides comprising:
      a first guide positioned before the magnetic head along the tape path, and
      a second guide positioned after the magnetic head along the tape path,
   wherein a distance between the first guide and the second guide along the tape path is less than 2 multiplied by a width of the magnetic tape.

14. The magnetic tape system of claim 13, wherein the first guide includes an upper flange and a lower flange and the second guide includes an upper flange and a lower flange, and wherein a distance between the upper and lower flanges of the first and second guides is less than 0.001 inch greater than a width of the magnetic tape.

15. A tape guide for data storage tape comprising:
   a tape path surface;
   an upper flange adjacent to the tape path surface; and
   a lower flange adjacent to the tape path surface, wherein the tape path surface between the upper flange and lower flange defines a width less than approximately 0.001 inch greater than a width of the data storage tape.

16. The tape guide of claim 15, wherein the tape path surface between the upper flange and lower flange defines a width less than approximately 0.0005 inch greater than the width of the data storage tape.

17. The tape guide of claim 15, wherein the tape guide defines a cylindrical-shaped core, wherein the tape path surface corresponds to at least a portion of the cylindrical-shaped core.

18. The tape guide of claim 15, wherein the tape guide comprises a hydrodynamic tape guide in which the tape path surface includes an air bearing surface.

19. The tape guide of claim 15, wherein the tape guide comprises a hydrostatic tape guide in which the tape path surface includes an air bearing surface.

20. The tape guide of claim 15, wherein the tape guide comprises a roller guide in which the tape path surface includes a roller.

* * * * *